UNITED STATES PATENT OFFICE.

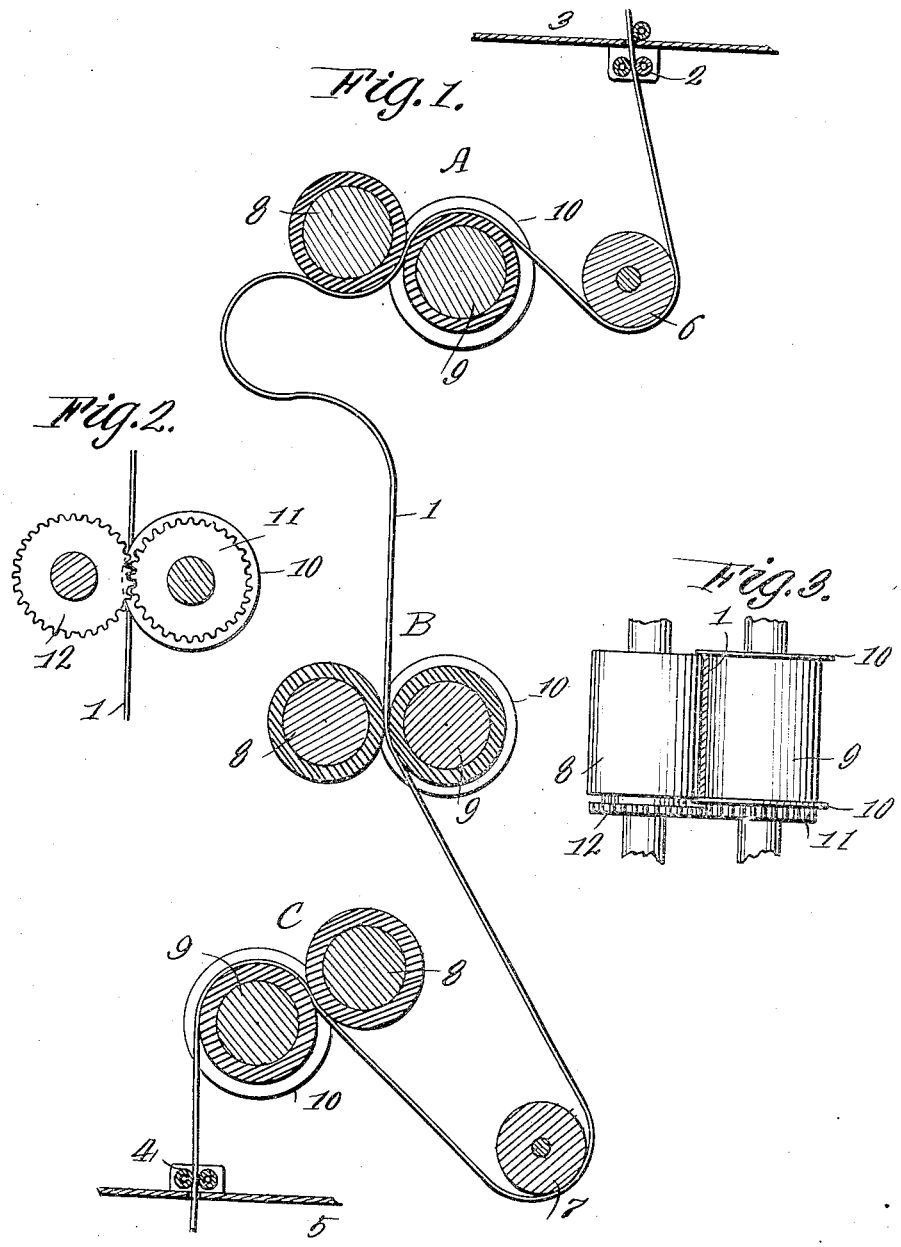

FREDERICK G. WHEELER, OF LOWELL, MASSACHUSETTS.

MOTION-PICTURE-FILM-FEEDING MECHANISM.

1,332,700.  Specification of Letters Patent.  Patented Mar. 2, 1920.

Application filed February 24, 1919. Serial No. 278,832.

*To all whom it may concern:*

Be it known that I, FREDERICK G. WHEELER, a citizen of the United States, residing at Lowell, in the county of Middlesex and State of Massachusetts, have invented certain new and useful Improvements in Motion-Picture-Film-Feeding Mechanism, of which the following is a specification.

The invention relates to moving picture machines and more particularly to the mechanism whereby the film is fed and directed in its movements and has for its object to prevent the strain upon the film which is the cause of the film breaking thereby producing delay and inconvenience and which is frequently the source of disaster from fire.

The invention also provides for the successful use of a film of relatively narrow width and the use of feed and guide rolls of less length, since the ordinary rows of openings along the edges of the film and the sprocket wheels coöperating therewith are dispensed with.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the accompanying drawing,

Figure 1 is a diagrammatic view showing the feed and guide rolls and a film trained thereover.

Fig. 2 is an end view of a pair of coöperating rollers showing the gearing for causing both to rotate positively at a uniform speed.

Fig. 3 is a top plan view of a pair of cooperating rollers.

Corresponding and like parts are referred to in the following description and indicated in the several views of the drawing by like reference characters.

The numeral 1 designates the film which is trained about a series of rollers. The numeral 2 designates the guide rollers associated with the upper magazine 3 and 4 the guide rollers associated with the lower magazine 5. A, B, and C designate pairs of coöperating rollers, the pair of rollers A serving to continuously draw the film from the magazine 3, the pair of rollers B intermittently feeding the film through the projecting mechanism and the pair of rollers C taking up the slack in the loop. The roller 6 gives proper direction to the film at a point between the rollers 2 and the feed rollers A. The roller 7 is located in the loop and gives the set thereto.

Inasmuch as the several pairs of rollers are of like construction one pair only will be described in detail as is illustrated more particularly in Figs. 2 and 3. Each pair of rollers comprises rollers 8 and 9. The rollers 8 and 9 may be of rubber or rubber faced so as to engage with the film and effect a positive movement thereof without producing injury thereto. The rollers 8 and 9 are of a like length which corresponds with the width of the film, as indicated most clearly in Fig. 3. One of the rollers as 9 is provided at its ends with flanges 10 which overlap the ends of the roller 8 and engage the edges of the film 1, thereby preventing lateral displacement of the film and insuring proper movement thereof in a given path. A gear wheel 11 is secured to the roller 9 so as to rotate therewith and meshes with a companion gear wheel 12 secured to the roller 8 and rotatable therewith. The gear wheels 11 and 12 are of like diameter, thereby causing the pair of rollers to rotate uniformly. The pairs of rollers A and C are continuously operated when the machine is in operation whereas the pair of rollers B are intermittently operated so as to effect a positive intermittent feed of the film through the projecting mechanism.

From the foregoing taken in connection with the accompanying drawing it will be understood that the invention enables a film of narrower width and rollers of less length than ordinary to be successfully used with pictures of a given size and moreover the chances for breaking of the film are reduced to the smallest amount possible because of reduction of the strain thereon occasioned by the use of films having rows of openings to coöperate with sprocket wheels. The film is gripped between yielding surfaces thereby distributing the strain throughout the entire width of the film instead of centralizing the same at given points as is the case with films having rows of openings adapted to coöperate with sprocket wheels.

The foregoing description and the drawing have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In moving picture mechanism, relatively upper, lower and intermediate pairs of rollers adapted to have the film pass therebetween, the upper and lower pairs of rollers being continuously driven and the intermediate pair of rollers being intermittently driven, the pairs of rollers being of like formation and diameter and having their surfaces yieldable, and one roller of each pair having end flanges to overlap the ends of the companion roller, and engage the edges of the film, and upper and lower guide rollers.

In testimony whereof I affix my signature in presence of two witnesses.

FREDERICK G. WHEELER.

Witnesses:
CHARLES F. BRENNAN,
CLARENCE B. NOYES.